(12) United States Patent
Wu et al.

(10) Patent No.: US 9,068,729 B2
(45) Date of Patent: Jun. 30, 2015

(54) LAMP

(71) Applicant: E Ink Holdings Inc., Hsinchu (TW)

(72) Inventors: Chi-Liang Wu, Hsinchu (TW); Po-Hsin Lin, Hsinchu (TW); Chin-Wen Lin, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 321 days.

(21) Appl. No.: 13/831,873

(22) Filed: Mar. 15, 2013

(65) Prior Publication Data

US 2014/0016321 A1    Jan. 16, 2014

(30) Foreign Application Priority Data

Jul. 10, 2012 (TW) ............... 101124808 A

(51) Int. Cl.
*G02B 26/00* (2006.01)
*F21V 13/10* (2006.01)
*F21V 14/00* (2006.01)
*G02F 1/167* (2006.01)
*G02B 26/02* (2006.01)

(52) U.S. Cl.
CPC ......... *F21V 13/10* (2013.01); *G02F 2001/1678* (2013.01); *G02B 26/026* (2013.01); *F21V 14/003* (2013.01); *G02F 1/167* (2013.01)

(58) Field of Classification Search
CPC ............ G02F 1/167; G02F 2001/1678; G02B 26/026
USPC .......... 359/296, 491.01, 483.01; 345/85, 107, 345/173
See application file for complete search history.

(56) References Cited

U.S. PATENT DOCUMENTS

| | | | |
|---|---|---|---|
| 6,376,828 B1 * | 4/2002 | Comiskey ...................... | 250/216 |
| 6,449,439 B1 * | 9/2002 | Boyd et al. ..................... | 396/374 |
| 6,473,072 B1 * | 10/2002 | Comiskey et al. ............. | 345/173 |
| 6,531,997 B1 * | 3/2003 | Gates et al. .................... | 345/107 |
| 6,839,158 B2 * | 1/2005 | Albert et al. ................... | 359/296 |
| 7,256,766 B2 * | 8/2007 | Albert et al. ................... | 345/107 |
| 7,433,114 B2 * | 10/2008 | Van Brocklin et al. ........ | 359/296 |
| 7,832,904 B2 | 11/2010 | Doherty et al. | |
| 7,929,198 B2 * | 4/2011 | Lipovetskaya et al. ........ | 359/296 |
| 8,014,060 B2 * | 9/2011 | Hong et al. ..................... | 359/296 |
| 8,233,212 B2 * | 7/2012 | Lipovetskaya et al. ........ | 359/296 |
| 8,434,909 B2 * | 5/2013 | Nichol et al. ............. | 362/296.01 |
| 8,896,922 B2 * | 11/2014 | Chang et al. ............. | 359/491.01 |
| 2007/0263388 A1 | 11/2007 | Lai et al. | |

* cited by examiner

*Primary Examiner* — Anabel Ton
(74) *Attorney, Agent, or Firm* — Jianq Chyun IP Office

(57) ABSTRACT

A lamp including a light source, a reflective unit and a light modulation module is provided. The light source provides an illuminating light, and the reflective unit reflects the illuminating light. The light modulation module is disposed between the light source and the reflective unit. In the light modulation module, a region where movable light absorbing materials exist is a light absorbing region, and a region where the movable light absorbing materials are absent is a light penetration region. By applying different electrical fields to the movable light absorbing materials, sizes and locations of the light absorbing region and the light penetration region can be changed. A portion of the illuminating light irradiating the light penetration region penetrates through the light penetration region, is transmitted to the reflective unit, being reflected by the reflective unit, and penetrates through the light penetration region again sequentially.

17 Claims, 10 Drawing Sheets

LAMP

CROSS-REFERENCE TO RELATED APPLICATION

This application claims the priority benefit of Taiwan application serial no. 101124808, filed on Jul. 10, 2012. The entirety of the above-mentioned patent application is hereby incorporated by reference herein and made a part of this specification.

BACKGROUND OF THE INVENTION

1. Field of the Invention

The invention is related to a lamp, and more particularly, to a lamp having a light modulation module for adjusting the illumination effect.

2. Description of Related Art

In the conventional lamp design, a reflective surface of a lamp is usually fixed and unchangeable, so that one type of lamps only corresponds to one kind of illumination effects in usage. For example, when the illumination light is irradiating a plane, the pattern formed by the illumination light is fixed. Moreover, the brightness of the illumination light which is irradiating the plane can not be adjusted by the lamp, so a plurality of light sources are set for changing the brightness by respectively turning on or turning off. However, adding more light sources also brings the raise of the production cost.

The lamp usually has a fixed geometric shape, and does not have the ability of changing the pattern of illumination light in response to the environment or user's requirement. Therefore, to achieve the better illumination effect, a common way is to change the shape or the design of the lamp. As the result, how to design a lamp which has a fixed reflective surface but is also capable of changing the illumination effect is still a main challenge for the people skilled in the art.

SUMMARY OF THE INVENTION

The invention provides a lamp having the ability of changing the illumination effect.

An embodiment of the invention provides a lamp including a light source, a reflective unit and a light modulation module. The light source provides an illumination light, and the reflective unit reflects the illumination light. The light modulation module is disposed on the reflective unit and between the light source and the reflective unit. Further, the light modulation module includes a movable light absorbing material. In the light modulation module, a region where the movable light absorbing material exists forms a light absorbing region, and a region where the movable light absorbing material is absent forms a light penetration region. The movable light absorbing material is moved to different positions respectively by applying different electrical fields, so as to change the sizes and the locations of the light absorbing region and the light penetration region. A portion of the illumination light irradiating the light penetration region penetrates the light penetration region, is transmitted to the reflective unit, is reflected by the reflective unit and penetrates through the light penetration region again in sequence.

In light of the foregoing descriptions, according to the embodiment of the invention, the lamp has the light modulation module including the movable light absorbing material. The movable light absorbing material is moved by applying various different electrical fields, so as to form the light absorbing region and the light penetration region between the light source and the reflective unit for changing the illumination effect of the illumination light.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1A:
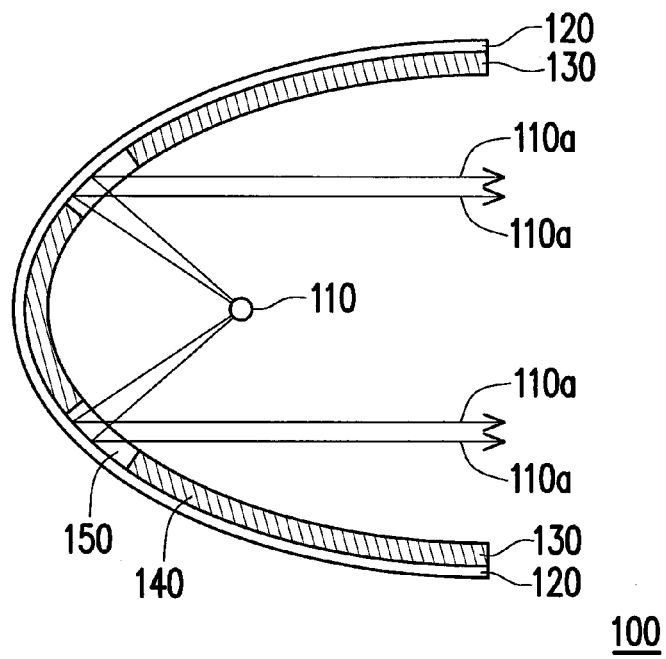
FIG. 1A is a schematic diagram illustrating the structure of a lamp according to an embodiment of the invention.
Figure 1B:
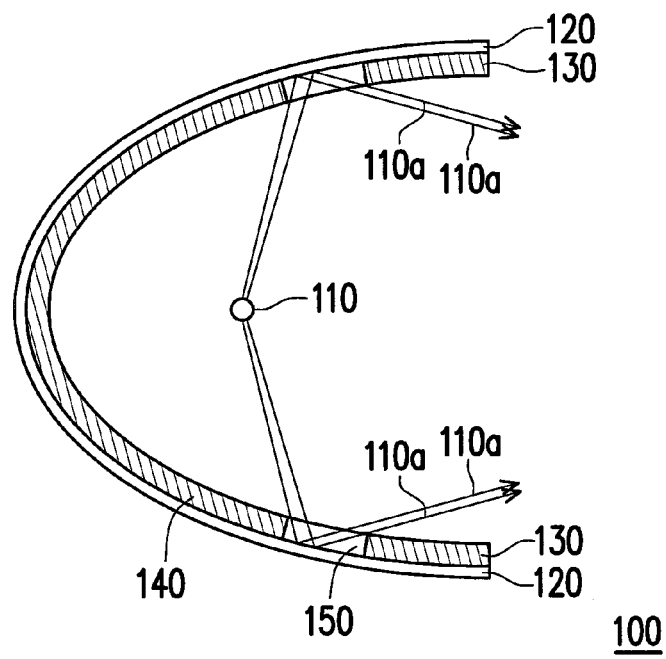
FIG. 1B is a schematic diagram illustrating the control of the lamp shown in FIG. 1A.
Figure 1C:
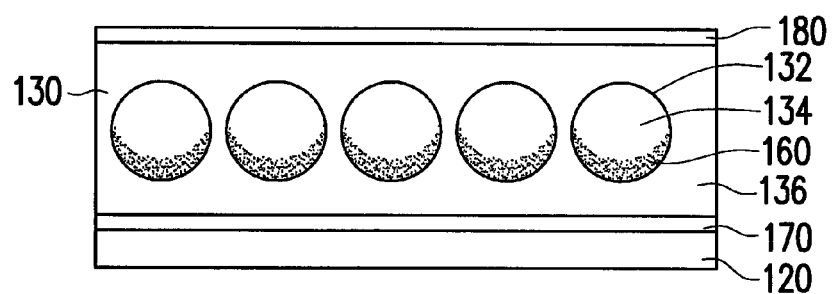
FIG. 1C is a cross-sectional diagram of the lamp shown in FIG. 1A.

FIG. 1A is a schematic diagram illustrating the structure of a lamp 100 according to an embodiment of the invention, and FIG. 1B is a schematic diagram illustrating the control of the lamp 100 shown in FIG. 1A. FIG. 1C is a cross-sectional diagram of the lamp 100 shown in FIG. 1A. Referring to FIG. 1A, the lamp 100 includes a light source 110, a reflective unit 120 and a light modulation module 130. The light source 110 provides an illumination light 110a, and the reflective unit 120 reflects the illumination light 110a. The light modulation module 130 is disposed on the reflective unit 120, and is disposed between the light source 110 and the reflective unit 120. The light modulation module 130 includes movable light absorbing materials. In the light modulation module 130, a region where the movable light absorbing materials exist is a light absorbing region 140, and a region where the movable light absorbing materials are absent is a light penetration region 150. The movable light absorbing material can be moved to different positions respectively by applying different electrical fields, so as to change sizes and locations of the light absorbing regions 140 and the light penetration regions 150. Comparing FIG. 1A with FIG. 1B, the sizes and the locations of the light absorbing regions 140 and the light penetration regions 150 in the light modulation module 130 are different. A portion of the illumination light 110a irradiating the light penetration region 150 penetrates the light penetration region 150, is transmitted to the reflective unit 120, is reflected by the reflective unit 120 and penetrates the light penetration region 150 again sequentially.

Referring to FIG. 1C, the movable light absorbing materials include a plurality of pigment particles 160 carrying charges, and the pigment particles 160 are moved by applying an external electrical field. In this embodiment, the pigment particles 160 are black particles. However, the invention is not limited to this. In other embodiments, the pigment particles can be other colors depend on the requirement to the lamp 100. In FIG. 1C, the light modulation module 130 includes a plurality of micro-containers 132 for containing pigment particles 160 carrying charges. The micro-container 132 can be a micro-capsule or any other container capable of containing pigment particles 160. In addition, the micro-containers are respectively filled with electrophoretic liquids 134, and the pigment particles 160 are soaked in the electrophoretic liquid 134. Moreover, the light modulation module 130 includes an adhesive layer 136, and the micro-containers 132 are distributed in the adhesive layer 136.

According to the previous described embodiment, the micro-containers 132 are fixed and distributed in the light modulation module 130 due to the adhesive layer 136. Therefore, even the pigment particles 160 carrying charges are moved by the electrical field applied to the light modulation module 130, the moving range of each particle is limited by the micro-container 132. In other words, each of the micro-containers 132 can be the minimum unit for controlling and moving the pigment particles 160 to change the sizes and the locations of the light absorbing regions 140 and the light penetration regions 150. By doing so, the pigment particles 160 can be respectively adjusted in order to change the sizes and the locations of the light absorbing regions 140 and the light penetration regions 150. As shown in FIG. 1C, when the black particles 160 of the micro-container 132 cover the underneath reflective unit 120, the light absorbing region 140 is formed. On the other hand, when the underneath reflective unit 120 is exposed by the black particles 160 of the micro-container 132, the light penetration region 150 is formed.

Figure 1D:
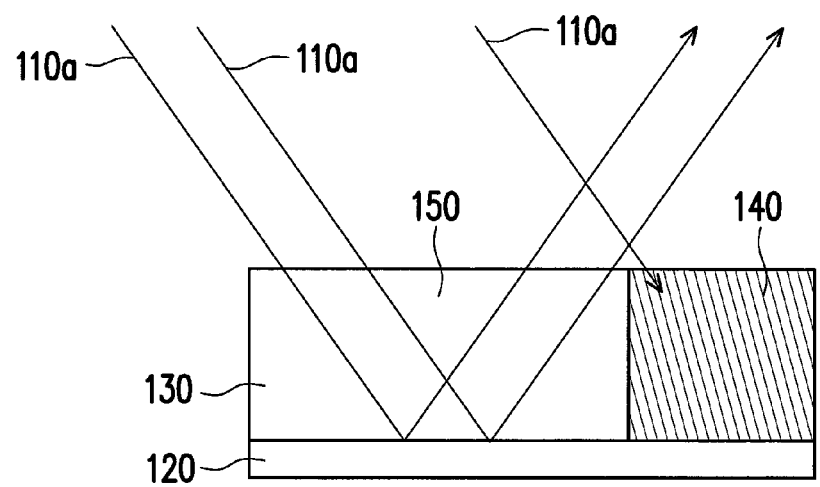
FIG. 1D is a schematic diagram illustrating the partial structure of the lamp according to an embodiment of the invention.

Referring to FIG. 1D, FIG. 1D is a schematic diagram illustrating the partial structure of the lamp 100 according to an embodiment of the invention. When the illumination light 100a irradiates the light penetration region 150, the illumination light 110a penetrates through the light penetration region 150, and the illumination light 110a is reflected by the reflective unit 120 so as to penetrate through the light penetration region 150 again. When the illumination light 110a irradiates the light absorbing region 140, the illumination light 110a is absorbed by the light absorbing region 140 and can not be reflected by the reflective unit 120.

According to the embodiments of FIG. 1A and FIG. 1D, a light source 110 of the lamp 100 is disposed in the reflective unit 120 and the light modulation module 130, and the reflective unit 120 is a reflective lamp cover having a metal surface (not illustrated) for reflecting the illumination light 110a of the light source 110. The illumination light 110a has to pass the light modulation module 130 disposed on the reflective unit 120 before being reflected by the reflective unit 120. The light modulation module 130 forms the light absorbing region 140 and the light penetration region 150 respectively according to the allocation of the movable light absorbing materials (i.e. the allocation of the pigment particles 106 as shown in FIG. 2B). The illumination light 110a only penetrates through the light penetration regions 150, is transmitted to the reflective unit 120 and is reflected by the reflective unit 120.

Figure 1E:
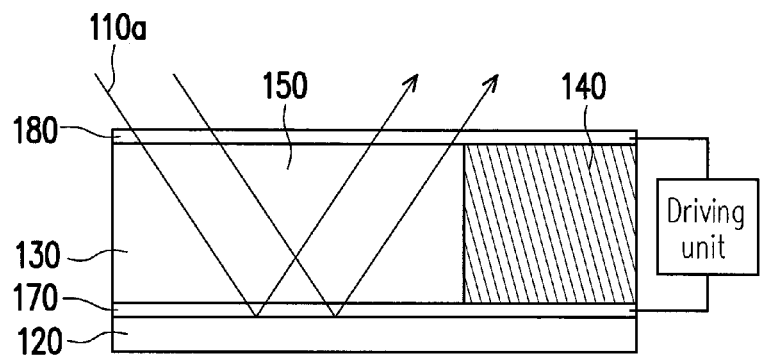
FIG. 1E is a schematic diagram illustrating the partial structure of the lamp according to another embodiment of the invention.

When different electrical fields are applied to the movable light absorbing materials, the movable light absorbing materials are moved to different positions in light modulation module 130. Therefore, by adjusting the electrical field applied to the light modulation module 130, the locations and the sizes of the light absorbing regions 140 and the light penetration regions 150 can be changed as well. FIG. 1E is a schematic diagram illustrating the partial structure of the lamp 100 according to another embodiment of the invention. In order to control the electrical field applied to the light modulation module 130, the lamp 100 further includes a first electrode layer 170 and a second electrode layer 180. The first electrode layer 170 is disposed between the light modulation module 130 and the reflective unit 120 (i.e. the reflective lamp cover in this embodiment), and the second electrode layer 180 is disposed between the light source 100 and the light modulation module 130. By controlling the first electrode layer 170 and the second electrode layer 180 to apply different electrical fields to the movable light absorbing materials, the positions of the movable light absorbing materials can be changed accordingly.

To be more specific, in order to let the illumination light penetrate through the first electrode layer 170 and the second electrode layer 180, the first electrode layer 170 and the second electrode layer 180 are transparent electrode layers, of which the material is, for example, indium tin oxide (ITO). However, the materials of the first electrode layer 170 and the second electrode layer 180 are not limited in the invention. When the illumination light 110a irradiates the light penetration region 150, the illumination light 110a penetrates through the second electrode layer 180, light penetration region 150 and the first electrode layer 170 sequentially, and then the illumination light is reflected by the reflective unit 120 (i.e. reflective lamp cover) so as to pass the above regions in reverse sequence. Moreover, a protection layer (not illustrated) may be disposed on the second electrode layer 180 to protect the second electrode layer 180.

Figure 1F:
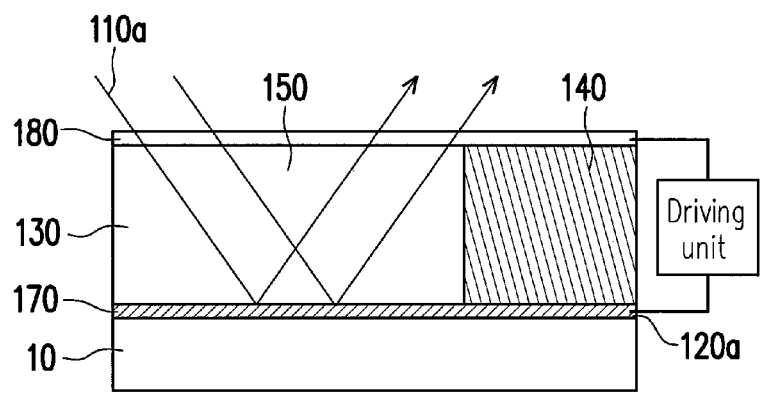
FIG. 1F is a schematic diagram illustrating the partial structure of the lamp according to another embodiment of the invention.

According to the above description, the reflective unit 120 is the reflective lamp cover, but the design in the invention is not limited thereto. Referring to FIG. 1F, FIG. 1F is a schematic diagram illustrating the partial structure of the lamp 100 according to another embodiment of the invention. The reflective unit 120a of the lamp 100 can be the first electrode layer 170, and the lamp 100 still has the second electrode layer 180 disposed between the light source 100 and the light modulation module 130. A lamp cover 10, such as the reflective lamp cover, the transmissive lamp cover or the opaque lamp cover, is disposed under the first electrode layer 170 as a carrier of the reflective unit 120a (the first electrode layer 170), the light modulation module 130 and the second electrode layer 180. The first electrode layer 170 and the second electrode layer 180 apply different electrical fields to the movable light absorbing materials in order to move the movable light absorbing materials to change the sizes and the locations of the light absorbing regions 140 and the light penetration regions 150. The first electrode layer 170 in this embodiment is a reflective electrode layer capable of reflecting the illumination light 110a. The material of the first electrode layer 170 can be the electrical conductive metal, and the metal surface of the first electrode layer 170 is capable of reflecting the illumination light 110a. The second electrode layer 180 is a transparent electrode layer.

Figure 2A:
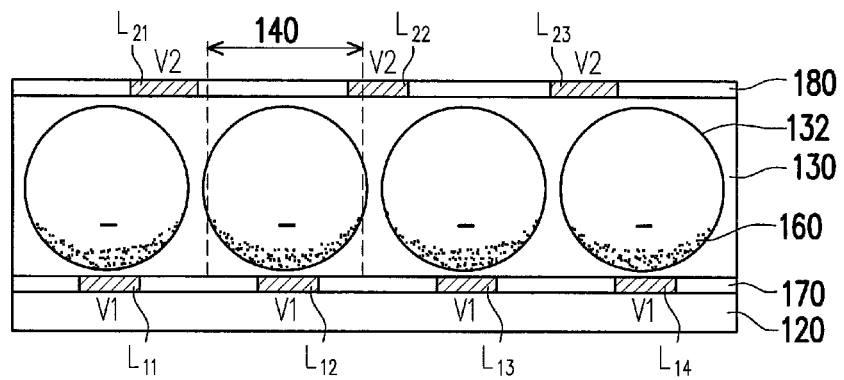
FIG. 2A is a schematic diagram illustrating a method of controlling electrodes in the lamp according to an embodiment of the invention.
Figure 2B:
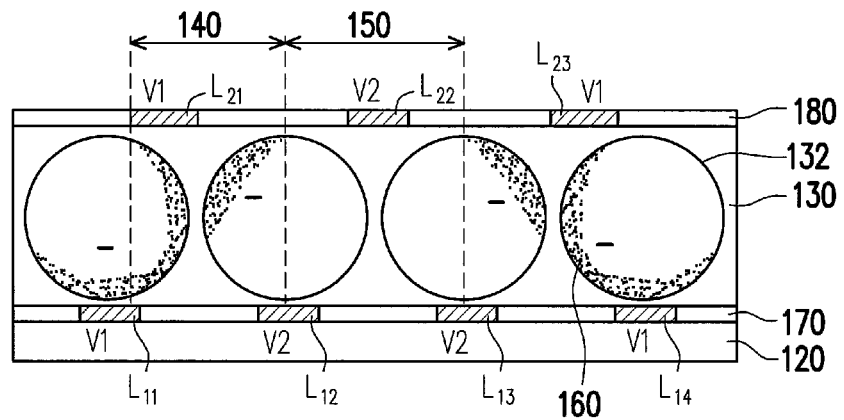
FIG. 2B is a schematic diagram illustrating another method of controlling the electrodes in the lamp shown in FIG. 2A.

To achieve the effect of controlling the pigment particles 160 carrying charges, the first electrode layer 170 can be the reflective unit 120a as previously described (shown in FIG. 1F) or can be another film layer different to the reflective unit 120 (shown in FIG. 1E, FIG. 2A and FIG. 2B). When the first electrode layer 170 is the film layer different to the reflective unit 120, the first electrode layer 170 is disposed between the reflective unit 120 and the light modulation module 130. The first electrode layer 170 and the second electrode layer 180 have various dispositions and designs. Moreover, a driving unit is employed to drive the light modulation module 130. Referring to FIG. 1E and FIG. 1F, the driving unit is electrically connected to the first electrode layer 170 and the second electrode layer 180 so as to apply different electrical fields to the movable light absorbing materials. Based on the method described above, the lamp 100 can be controlled to change the patterns of the light absorbing regions 140 and the light penetration regions 150, such as the patterns shown in FIG. 1A and FIG. 1B, so as to obtain different illumination effects. Various embodiments of the lamp 100 in the invention are feasible, and the following embodiments and figures (FIG. 2A~FIG. 5C) are only a portion of all the possible embodiments. It should be noted that, in the following embodiments, the first electrode layer 170 is the film layer different to the reflective unit 120. However, the lamp 100 of the invention is not limited thereto. In other embodiments, the first electrode layer 170 is the reflective layer 120a. To be more specific, the first electrode layer 170 in FIG. 2A~FIG. 5C can be replaced by a reflective electrode layer to form the reflective unit 120a, and the reflective unit 120 can be the lamp cover 10 shown in FIG. 1F.

FIG. 2A is a schematic diagram illustrating a method of controlling electrodes in the lamp according to an embodiment of the invention. Referring to FIG. 2A, The first electrode layer 170 includes a plurality of first electrodes L11~L14 separated from each other, and the second electrode layer 180 includes a plurality of second electrodes L21~L23 separated from each other. A pitch of the first electrodes is different to a pitch of the second electrodes. In FIG. 2A, the first electrode layer 170 includes four first electrodes L11~L14 corresponding to four micro-containers 132, but the second electrode layer 180 only includes three second electrodes L21~L23 corresponding to four micro-containers 132. In this embodiment, the micro-container 132 contains a plurality of black particles 160 carrying negative charges, and the black particles 160 are respectively moved to different positions by the first electrode layer 170 and the second electrode layer 180 which apply different electrical fields to the black particles.

According to FIG. 2A, the lamp 100 has a driving unit (as shown in FIG. 1E and FIG. 1F) for driving the first electrodes L11~L14 and the second electrodes L21~L23. The first electrodes L11~L14 have a first voltage, and the second electrodes L21~L23 have a second voltage. The first voltage is different to the second voltage. In this embodiment, the first voltage is greater than the second voltage. In FIG. 2A and following figures, the electrode with V1 label has the first voltage, and the electrode with V2 label has the second voltage. The first voltage is greater than the second voltage. However, in other embodiments, the first voltage is smaller than the second voltage. Since the pigment particles 160 located in the micro-containers 132 carry the negative charges, the particles 160 are moved towards the first electrodes L11~L14 because of the voltage difference between the first electrodes L11~L14 and the second electrodes L21~L23. As the result, the pigment particles 160 cover a portion of the reflective unit 120 under the micro-container 132 to form the light absorbing region 140. (In FIG. 2A and following figures, the pigment particles with "+" label carry positive charges, and the pigment particles with "−" label carry negative charges.) On the other hand, in an embodiment which is not shown with figure, when the first electrodes L11~L14 have the second voltage and the second electrodes L21~L23 have the first voltage, the pigment particles 160 carrying negative charges are moved towards the second electrodes L21~L23, but the pigment particles 160 still cover a portion of the reflective unit 120 under the micro-containers 132 to form the light absorbing region 140.

In FIG. 2A, a portion of the light modulation module 130 has a large light absorbing region 140, so the illumination light irradiating the portion of the light modulation module 130 are hardly to penetrate through the light modulation module 130 and to further transmit to the underneath reflective unit 120.

Referring to FIG. 2B, FIG. 2B is a schematic diagram illustrating another method of controlling the electrodes in the lamp 100 shown in FIG. 2A. According to FIG. 2B, the first electrodes L11, L14 and the second electrodes L21, L23 have the first voltage, and the first electrodes L12, L13 and the second electrode L22 have the second voltage. In this embodiment, the first voltage is greater than the second voltage. Since the pigment particles 160 carry negative charges, when the pigment particles 160 are affected by the electrical field due to the voltage difference between the first electrodes L11~L14 and the second electrodes L21~L23, the pigment particles 160 are moved towards the first electrodes L11, L14 and the second electrodes L21, L23 having the first voltage, and are moved away from the first electrodes L12, L13 and the second electrode L22 having the second voltage. Therefore, in FIG. 2B, the pigment particles carrying charges in the micro-container 132 still cover a portion of the reflective unit 120 and form the light absorbing region 140. Accordingly, a portion of the micro-container 132 without the pigment particles exposes a portion of the reflective unit 120 and forms the light penetration region 150. As the result, the illumination light irradiating the light penetration region 150 penetrates through the light penetration region 150, is reflected by the reflective unit 120 and penetrates through the light penetration region 150 again sequentially.

Figure 2C:
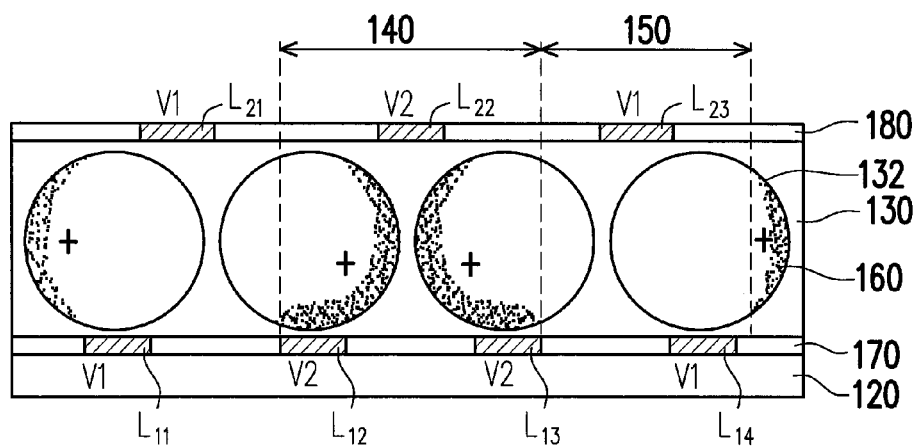
FIG. 2C is a schematic diagram illustrating a method of controlling the electrodes in the lamp which includes pigment particles carrying positive charges shown in FIG. 2A.

Except the above-mentioned embodiments, the pigment particles 160 in the micro-containers 132 can be the pigment particles 160 carrying the positive charges. FIG. 2C is a schematic diagram illustrating a method of controlling the electrodes in the lamp which includes the pigment particles carrying positive charges shown in FIG. 2A. Referring to FIG. 2C, the voltages of the first electrodes L11~L14 and the second electrodes L21~L23 and the voltages of the first electrodes L11~L14 and the second electrodes L21~L23 in the FIG. 2B have the same pattern. Also, the first voltage is greater than the second voltage, but the pigment particles 160 carry the positive charges. Therefore, pigment particles 160 are moved towards the first electrodes L12, L13 and the second electrode L22 having the second voltage to form the light absorbing regions 140. A portion of the micro-container 132 without the pigment particles 160 exposes the portion of the reflective unit 120 to form the light penetration region 150. In other embodiments, the first voltage may be smaller than the second voltage.

As mentioned above, the reflective unit 120 may be the reflective lamp cover, or the first electrodes L11~L14 of the first electrode layer 170 may be the reflective unit 120a (not shown in the drawings, but can be deduced from the FIG. 1F). Additionally, in the first electrode layer 170 and the second electrode layer 180, the number of the first electrode and the second electrode may also be changed in regard to the design.

Figure 3A:
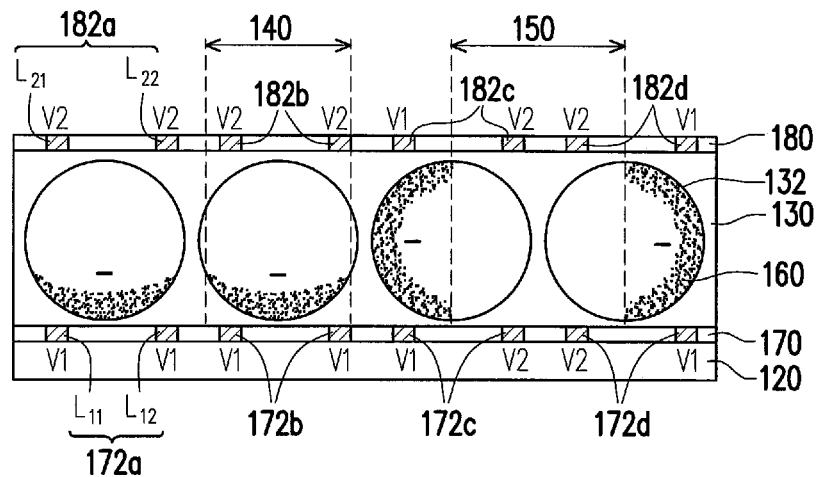
FIG. 3A is a schematic diagram illustrating a method of controlling electrodes in the lamp according to another embodiment of the invention.

FIG. 3A is a schematic diagram illustrating a method of controlling electrodes in the lamp 100 according to another embodiment of the invention. Referring to the FIG. 3A, the first electrode layer 170 includes a plurality of first electrode groups 172a~172d, and the second electrode layer 180 includes a plurality of the second electrode groups 182a~182d. Each of micro-containers is disposed between one of the first electrode groups and one of the second electrode groups. For example, the micro-containers 132 are disposed between the first electrode group 172a and the second electrode group 182a, and the plurality of pigment particles 160 carrying negative charges are located inside the micro-container 132.

In this embodiment, each of the first electrode groups 172a~172d includes the plurality of first electrodes L11~L12 disposed in the first electrode layer 170, and each of the second electrode groups 182a~182d includes the plurality of second electrodes L21~L22 disposed in the second electrode layer 180. In each of the first electrode groups 172a~172d and each of the second electrode groups 182a~182d which are disposed correspondingly to each micro-container 132, the number of the first electrodes and the number of the second electrodes are the same, and the first electrodes and the second electrodes are respectively disposed at the corresponding positions as shown in FIG. 3A. Besides the micro-containers 132, the first electrodes L11, L12 of the first electrode groups 172a and 172b have the first voltage, and the second electrodes L21, L22 of the second electrode groups 182a, 182b have the second voltage. Moreover, in this embodiment, the first voltage is greater than the second voltage. Since the pigment particles 160 in the micro-containers 132 are the pigment particles 160 carrying negative charges, the pigment particles 160 are moved towards the first electrode groups 172a, 172b and moved away from the second electrode group 182a, 182b. The pigment particles cover a portion of the reflective unit 120 under the micro-container 132 to form the light absorbing regions 140.

Regarding to the first electrode group 172c and the second electrode group 182c disposed at the opposite sides of the micro-container 132, when the portion of the first electrodes L11 and the portion of the second electrodes L21 have the first voltage, and the portion of the first electrode L21 and the portion of the second electrode L22 have the second voltage, the pigment particles 160 carrying negative charges are moved towards the first electrode L11 of the first electrode group 172c and the second electrode L21 of the second electrode group 182c. The portion of the micro-container 132 without the pigment particles 160 exposes the portion of the reflective unit 120 to form the light penetration region 150. Moreover, referring to FIG. 3A, in the first electrode group 172d and the second electrode group 182d disposed at the opposite sides of the micro-containers 132, when the portion of the first electrodes L11 and the portion of the second electrodes L21 have the second voltage, and the portion of the first electrodes L12 and the portion of the second electrodes L22 have the first voltage, the pigment particles 160 are moved towards the first electrode L12 and the second electrode L22 to expose the portion of the reflective unit 120, so as to form the light penetration region 150. In other embodiments, the first voltage may be smaller than the second voltage.

According to the above-mentioned embodiment, the first electrodes L11~L12 and the second electrodes L21~L22 included in different first electrode groups 172a~172d and different second electrode groups 182a~182d are capable of respectively changing the voltage to be the first voltage or the second voltage. By using the voltage difference between the electrodes, the pigment particles 160 are moved to form the light penetration regions 150 and the light absorbing regions 140 in the micro-containers 132.

Figure 3B:
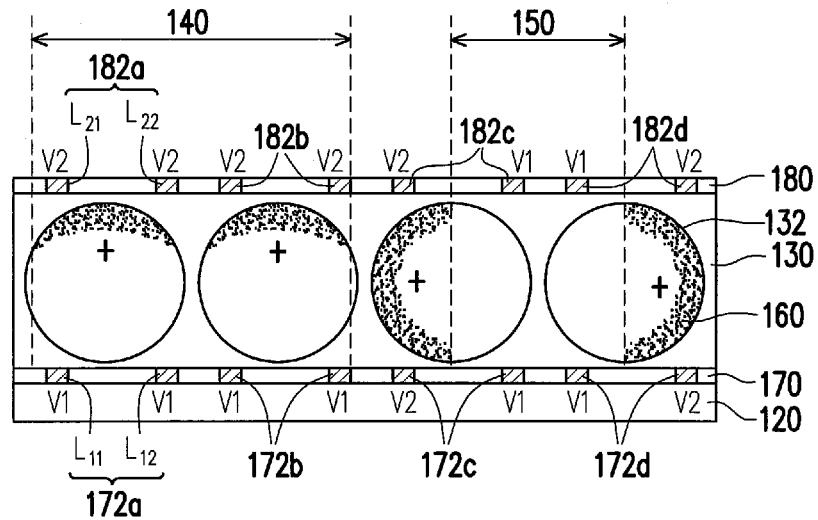
FIG. 3B is a schematic diagram illustrating a method of controlling the electrodes in the lamp which includes pigment particles carrying positive charges shown in FIG. 3A.

FIG. 3B is a schematic diagram illustrating a method of controlling the electrodes in the lamp which includes the pigment particles carrying positive charges shown in FIG. 3A. The pigment particles 160 in the micro-containers 132 carry the positive charges, and the first voltage is greater than the second voltage in this embodiment. Therefore, in this embodiment, besides the micro-containers 132, when the first electrodes L11, L12 of the first electrode groups 172a and 172b have the first voltage, and the second electrodes L21, L22 of the second electrode groups 182a, 182b have the second voltage, the pigment particles 160 are moved away from the first electrode groups 172a, 172b and are moved towards the second electrode group 182a, 182b to cover a portion of the reflective unit 120 under the micro-container 132 to form the light absorbing region 140.

By applying the driving unit (as shown in FIG. 1E and FIG. 1F) of the lamp 100 for the first electrode group 172c and the second electrode group 182c disposed at the opposite sides of the micro-container 132, when the portion of the first electrodes L11 and the portion of the second electrode L21 have the second voltage, and the portion of the first electrodes L12 and the portion of the second electrodes L22 have the first voltage, the pigment particles 160 are moved towards the first electrode L11 of the first electrode group 172c and the second electrode L21 of the second electrode group 182c. The portion of the micro-container 132 without the pigment particles 160 exposes the portion of the reflective unit 120 to form the light penetration region 150. In the first electrode group 172d and the second electrode group 182d disposed at the opposite sides of the micro-containers 132, when the portion of the first electrodes L11 and the portion of the second electrodes L21 have the first voltage, and the portion of the first electrodes L12 and the portion of the second electrodes L22 have the second voltage, the pigment particles 160 are moved towards the first electrode L12 and the second electrode L22 to form the light penetration region 150. In other embodiments, the first voltage may be smaller than the second voltage. In other words, a magnitude relationship between the first voltage and the second voltage can be changed in regard to the situation, so the magnitude relationships in other embodiments may not be the same as the magnitude relationship in this embodiment.

The numbers of the first electrodes and the second electrodes included in the first electrode group and the second electrode group and the numbers of the first electrode groups and the second electrode groups included in the first electrode layer and the second electrode layer are not limited by the previously described embodiments.

Figure 4A:
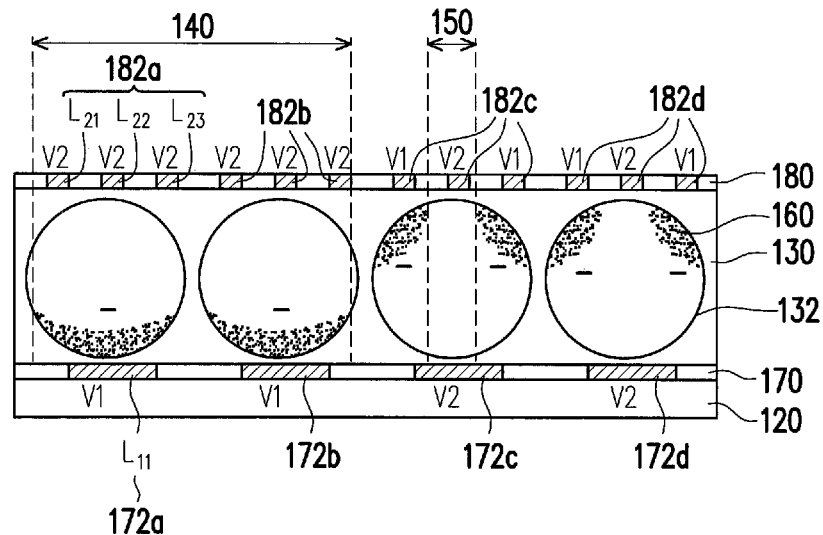
FIG. 4A is a schematic diagram illustrating a method of controlling electrodes in the lamp according to an embodiment of the invention.

FIG. 4A is a schematic diagram illustrating a method of controlling electrodes in the lamp 100 according to another embodiment of the invention. Referring to the FIG. 4A, the first electrode layer 170 includes a plurality of first electrode groups 172a~172d, and the second electrode layer 180 includes a plurality of the second electrode groups 182a~182d. In this embodiment, each of the first electrode groups 172a~172d respectively disposed in the first electrode layer 170 includes a consecutive first electrode L11, and each of the second electrode groups 182a~182d respectively disposed in the second electrode layer 180 includes a plurality of second electrodes L21~L23 separated from each other. Each of micro-containers 132 is correspondingly disposed between one of the first electrode groups 172a~172d and one of the second electrode groups 182a~182d. By applying the driving unit of the lamp 100 for driving the electrodes (as shown in FIG. 1E and FIG. 1F), when the first electrodes L11 of the first electrode groups 172a and 172b have the first voltage, and the second electrodes L21, L21 and L23 of the second electrode groups 182a, 182b have the second voltage, and when the first voltage is greater than the second voltage in this embodiment, the pigment particles 160 are moved towards the first electrodes L11 to cover the portions of the reflective unit 120 under the micro-containers 132 to form the light absorbing region 140.

However, in the first electrode groups 172c, 172d and the second electrode groups 182c, 182d disposed at the opposite sides of the micro-containers 132, when the portion of the first electrodes L11 and the portion of the second electrode L22 have the first voltage, and the portion of the second electrodes L21, L23 have the first voltage, the pigment particles 160 are moved towards the second electrodes L21, L23 to expose the portion of the reflective unit 120 so as to form the light penetration region 150. In other embodiments, the first voltage may be smaller than the second voltage.

Figure 4B:
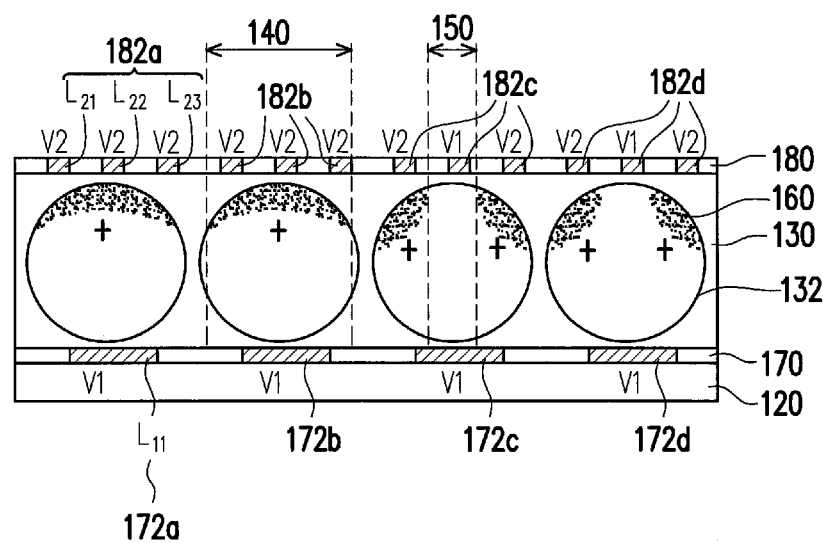
FIG. 4B is a schematic diagram illustrating a method of controlling the electrodes in the lamp which includes pigment particles carrying positive charges shown in FIG. 4A.

FIG. 4B is a schematic diagram illustrating a method of controlling the electrodes in the lamp 100 which includes the pigment particles carrying positive charges shown in FIG. 4A. In this embodiment, since the pigment particles 160 carry positive charges, when the first electrodes L11 of the first electrode groups 172a, 172b have the first voltage, and the second electrodes L21, L21 and L23 of the second electrode groups 182a, 182b have the second voltage (the first voltage is greater than the second voltage herein), the pigment particles 160 are moved away from the first electrodes L11 and towards the second electrodes L21~L23 to cover the portions of the reflective unit 120 under the micro-containers 132 so as to form the light absorbing regions 140. In the first electrode groups 172c, 172d and the second electrode groups 182c, 182d disposed at the opposite sides of the micro-containers 132, when the portion of the first electrodes L11 and the portion of the second electrode L22 have the first voltage, and the portion of the second electrodes L21, L23 have the second voltage, the pigment particles 160 carrying positive charges are moved towards the second electrodes L21, L23 having the second voltage to expose the portion of the reflective unit 120 so as to form the light penetration regions 150.

Figure 4C:
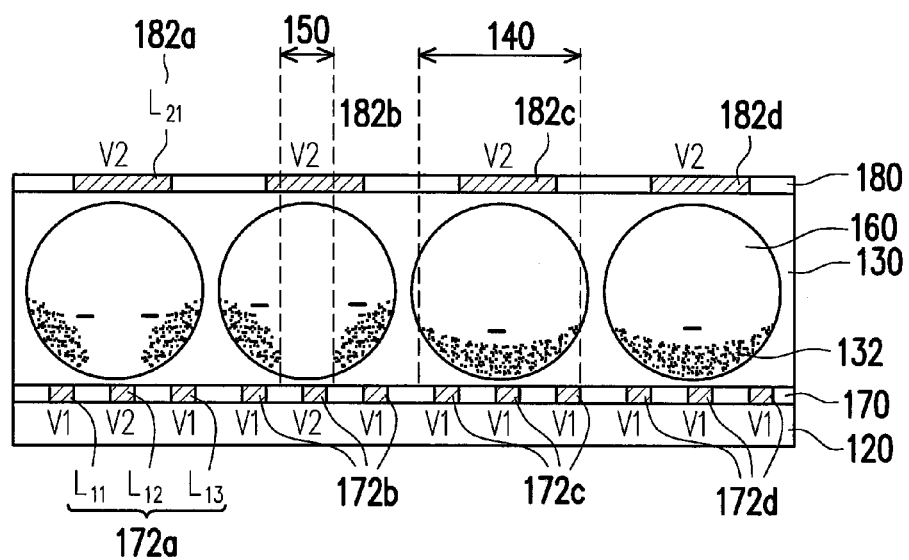
FIG. 4C is a schematic diagram illustrating another method of disposing the electrodes in the lamp shown in FIG. 4A.

FIG. 4C is a schematic diagram illustrating another method of disposing the electrodes in the lamp 100 shown in FIG. 4A. Each of the first electrode groups 172a~172d respectively disposed in the first electrode layer 170 includes a plurality of first electrodes L11~L13 separated from each other, and each of the second electrode groups 182a~182d respectively disposed in the second electrode layer 180 includes a consecutive second electrode L21. The pigment particles carry negative charges. In this embodiment, when the first electrodes L11~L13 of the first electrode groups 172c, 172d have the first voltage, and the second electrodes L21 of the second electrode groups 182c, 182d have the second voltage (the first voltage is greater than the second voltage herein), the pigment particles 160 are moved away from the second electrodes L21 and moved towards the first electrodes L11~L13 to cover the portions of the reflective unit 120 under the micro-containers 132 so as to form the light absorbing regions 140. In the first electrode groups 172c, 172d and the second electrode groups 182c, 182d disposed at the opposite sides of the micro-containers 132, when the portion of the first electrodes L12 and the portion of the second electrode L21 have the second voltage, and the portion of the first electrodes L11, L13 have the first voltage, the pigment particles 160 carrying negative charges are moved towards the first electrodes L11, L13 having first voltage to expose the portion of the reflective unit 120 so as to form the light penetration region 150. In other embodiments, the first voltage may be smaller than the second voltage.

The arrangement of the first electrodes and the second electrodes, the number of the first electrode and the polarity of the pigment particles in the micro-containers are not limited by the descriptions of the previous embodiments, and can be selected according to the design and the user's requirement.

Figure 5A:
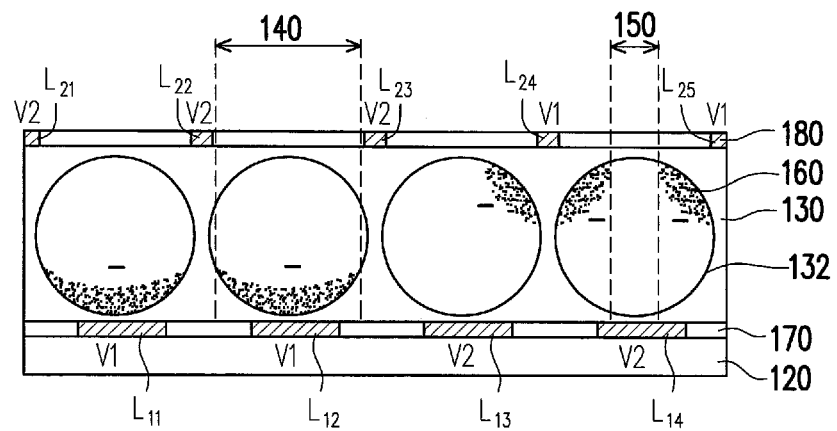
FIG. 5A is a schematic diagram illustrating a method of controlling electrodes in the lamp according to another embodiment of the invention.

FIG. 5A is a schematic diagram illustrating a method of controlling electrodes in the lamp 100 according to another embodiment of the invention. The first electrode layer 170 includes a plurality of first electrodes L11~L14, and the second electrode layer 180 includes a plurality of second electrodes L21~L25. Referring to FIG. 5A, each of the second electrodes L21~L25 is disposed at the corresponding position between two adjacent micro-containers 132. Each of the first electrodes L11~L14 is disposed at the position corresponding to one micro-containers 132. In this embodiment, by applying the driving unit of the lamp 100 for driving electrodes (as shown in FIG. 1E and FIG. 1F), when the first electrodes L11~L12 have the first voltage, and the second electrodes L21~L23 have the second voltage (the first voltage is greater than the second voltage), the pigment particles 160 carrying negative charges are moved towards the first electrodes L11~L12 to cover the portion of the reflective unit 120 under the micro-containers 132 to form the light absorbing region 140. On the contrary, when the first electrodes L13~L14 have the second voltage and the second electrode L24~L25 have the first voltage, the pigment particles 160 are moved towards the second electrodes L24, L25 to expose the portion of the reflective unit 120 so as to form the light penetration region 150. In other embodiments, the first voltage may be smaller than the second voltage.

Figure 5B:
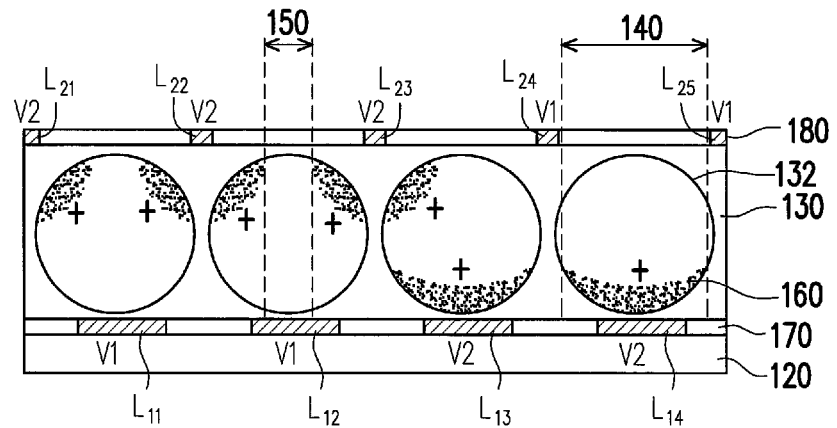
FIG. 5B is a schematic diagram illustrating a method of controlling the electrodes in the lamp which includes pigment particles carrying positive charges shown in FIG. 5A.

The pigment particles 160 of the micro-containers 132 can be the pigment particles 160 carrying positive charges. FIG. 5B is a schematic diagram illustrating a method of controlling the electrodes in the lamp which includes the positive pigment particles shown in FIG. 5A. As described above, the pigment particles 160 carry the positive charges. When the first electrodes L11~L12 have the first voltage and the second electrodes L21~L23 have the second voltage, the pigment particles 160 are moved towards the second electrodes L21~L23 to expose the portion of the reflective unit 120 so as to form the light penetration region 150. On the contrary, when the first electrodes L13~L14 have the second voltage and the second electrodes L24~L25 have the first voltage (the first voltage is greater than the second voltage in this embodiment), the pigment particles 160 are moved towards the first electrodes L13~L14 to cover the portion of the reflective unit 120 under the micro-containers 132 so as to form the light absorbing region 140.

Figure 5C:
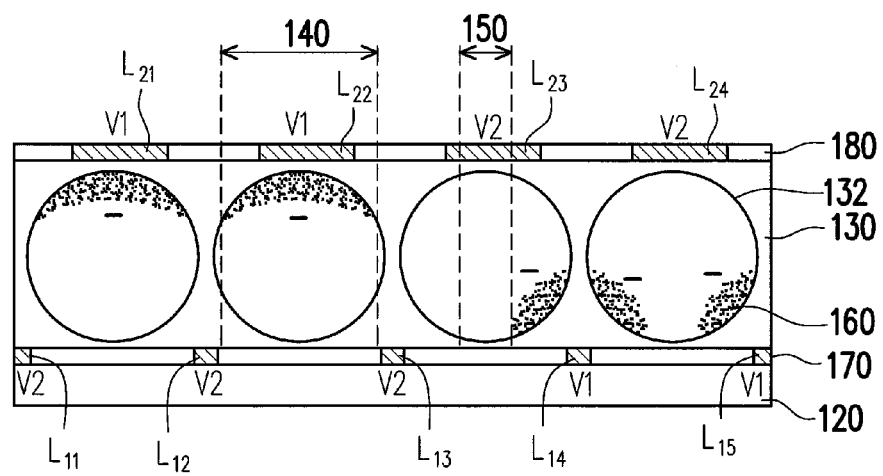
FIG. 5C is a schematic diagram illustrating another method of disposing the electrodes in the lamp shown in FIG. 5A.

In addition, the arrangement of the first electrodes and the second electrodes can be changed in regard to the requirement. FIG. 5C is a schematic diagram illustrating another method of disposing the electrodes in the lamp 100 shown in FIG. 5A. In FIG. 5C, each of the first electrodes L11~L14 is disposed at the corresponding position between two adjacent micro-containers 132, and each of the second electrodes L21~L24 is disposed at the position corresponding to one micro-container 132. As described above, the pigment particles 160 carry negative charges. When the second electrodes L21~L22 have the first voltage and the first electrodes L11~L13 have the second voltage (the first voltage is greater than the second voltage in this embodiment), the pigment particles 160 are moved towards the second electrodes L21~L22 to cover the portion of the reflective unit 120 under the micro-containers 132 so as to form the light absorbing region 140. On the contrary, when the second electrodes L23~L24 have the second voltage and the first electrodes L14~L15 have the first voltage, the pigment particles 160 are moved towards the first electrodes L14, L15 to expose the portion of the reflective unit 120 so as to form the light penetration regions 150. In other embodiments, the first voltage may be smaller than the second voltage.

In summary, the lamp provided in the embodiments of the invention employs the first electrode layer and the second electrode layer to apply the electrical field to the movable light absorbing material (i.e. the pigment particles carrying charges). By doing so, the sizes and the locations of the light absorbing region and the light penetration region are adjusted for changing the illumination effect, and the illumination effect is generated from reflecting the illumination light by the lamp. Therefore, a lamp with multiple illumination effect is achieved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A lamp, comprising:
   a light source, providing an illumination light;
   a reflective unit, reflecting the illumination light; and
   a light modulation module, disposed on the reflective unit and located between the light source and the reflective unit, the light modulation module comprising a movable light absorbing material, wherein a region where the movable light absorbing material exists forms a light absorbing region, and a region where the movable light absorbing material is absent forms a light penetration region, the movable light absorbing material is moved to different positions respectively by applying a plurality of different electrical fields, so that sizes and locations of the light absorbing region and the light penetration region are changed, a portion of the illumination light irradiating the light penetration region penetrates through the light penetration region, is transmitted to the reflective unit, is reflected by the reflective unit, and penetrates through the light penetration region again sequentially.

2. The lamp as claimed in claim 1, wherein the reflective unit is a reflective lamp cover, and the light source is disposed in the reflective lamp cover.

3. The lamp as claimed in claim 2, further comprising:
   a first electrode layer, disposed between the light modulation module and the reflective lamp cover; and
   a second electrode layer, disposed between the light source and the light modulation module, wherein the first electrode layer and the second electrode layer apply different electrical fields to the movable light absorbing material.

4. The lamp as claimed in claim 3, wherein the first electrode layer and the second electrode layer are transparent electrode layers.

5. The lamp as claimed in claim 1, wherein the reflective unit is a first electrode layer, the lamp further comprises a second electrode layer, the second electrode layer is disposed between the light source and the light modulation module, the first electrode layer and the second electrode layer apply different electrical fields to the movable light absorbing material, and the first electrode layer is a reflective electrode layer.

6. The lamp as claimed in claim 1, wherein the movable light absorbing material comprises a plurality of pigment particles carrying charges.

7. The lamp as claimed in claim 6, wherein the light modulation module further comprises:
   a plurality of micro-containers, containing the pigment particles carrying charges; and
   a plurality of electrophoretic liquids respectively filled in the micro-containers, wherein the pigment particles carrying charges are soaked in the electrophoretic liquids.

8. The lamp as claimed in claim 7, wherein the light modulation module comprises an adhesive layer, and the micro-containers are distributed in the adhesive layer.

9. The lamp as claimed in claim 7, further comprising:
   a first electrode layer, wherein the first electrode layer is the reflective unit or a film layer different to the reflective unit, the film layer is disposed between the reflective unit and the light modulation module; and
   a second electrode layer, disposed between the light source and the light modulation module, wherein the first electrode layer and the second electrode layer apply different electrical fields to the movable light absorbing material.

10. The lamp as claimed in claim 9, wherein the first electrode layer comprises a plurality of first electrodes separated from each other, the second electrode layer comprises a plurality of second electrodes separated from each other, and a pitch of the first electrodes is different to a pitch of the second electrodes.

11. The lamp as claimed in claim 9, wherein the first electrode layer comprises a plurality of first electrode groups, the second electrode layer comprises a plurality of second electrode groups, and each of the micro-containers is disposed between one of the first electrode groups and one of the second electrode groups.

12. The lamp as claimed in claim 11, wherein the first electrode group comprises a plurality of first electrodes, and the second electrode group comprises a plurality of second electrodes, and wherein when the first electrodes disposed beside the micro-container have a first voltage, and when the second electrodes disposed beside the micro-container have a second voltage, the pigment particles of the micro-container cover a portion of the reflective unit under the micro-container, and the first voltage is different to the second voltage.

13. The lamp as claimed in claim 12, wherein when a portion of the first electrodes and a portion of the second electrodes which correspond to each other and are disposed at opposite sides of the micro-container have the first voltage, and another portion of the first electrodes and another portion of the second electrodes which correspond to each other and are disposed at opposite sides of the micro-container have the second voltage, the pigment particles are moved towards the portion of the first electrodes and the portion of the second electrodes having the first voltage to expose a portion of the reflective unit.

14. The lamp as claimed in claim 11, wherein each of the first electrode groups is a consecutive first electrode, and each of the second electrode groups comprises a plurality of second electrodes separated from each other, wherein when the first electrode has a first voltage, and each of the second electrodes has a second voltage, the pigment particles cover a portion of the reflective unit under the micro-container, and wherein when a portion of the second electrodes has the first voltage and when another portion of the second electrodes has the second voltage, the pigment particles are moved towards the portion of the second electrodes having the first voltage to expose a portion of the reflective unit, where the first voltage is different to the second voltage.

15. The lamp as claimed in claim 11, wherein each of the first electrode groups comprises a plurality of first electrodes separated from each other, and each of the second electrode groups is a consecutive second electrode, wherein when each of the first electrodes has a first voltage, and the second electrode has a second voltage, the pigment particles cover a portion of the reflective unit under the micro-container, and wherein when a portion of the first electrodes has the first voltage and another portion of the first electrodes has the second voltage, the pigment particles are moved towards the portion of the first electrodes having the first voltage to expose a portion of the reflective unit, where the first voltage is different to the second voltage.

16. The lamp as claimed in claim 9, wherein the first electrode layer comprises a plurality of first electrodes, and the second electrode layer comprises a plurality of second electrodes, each of the second electrodes corresponds to a position between two adjacent micro-containers, and each of the first electrodes corresponds to one of the micro-containers, wherein when the first electrode disposed beside the micro-container has a first voltage, and the second electrodes disposed beside the micro-container have a second voltage, the pigment particles are moved towards the first electrode to cover a portion of the reflective unit under the micro-container, and wherein when the first electrode disposed beside the micro-container has the second voltage, and the second electrodes disposed beside the micro-container have the first voltage, the pigment particles are moved towards the second electrodes to expose a portion of the reflective unit, where the first voltage is different to the second voltage.

17. The lamp as claimed in claim 9, wherein the first electrode layer comprises a plurality of first electrodes, and the second electrode layer comprises a plurality of second electrodes, each of the first electrodes corresponds to a position between two adjacent micro-containers, and each of the second electrodes corresponds to one of the micro-container, wherein when the first electrodes disposed beside the micro-container have a first voltage, and when the second electrode disposed beside the micro-container has a second voltage, the pigment particles are moved towards the first electrodes to expose a portion of the reflective unit, and wherein when the first electrodes disposed beside the micro-container have the second voltage, and when the second electrode disposed beside the micro-container has the first voltage, the pigment particles are moved towards the second electrode to cover a portion of the reflective unit under the micro-container, where the first voltage is different to the second voltage.

* * * * *